United States Patent
Roehrle

(10) Patent No.: US 9,751,494 B2
(45) Date of Patent: Sep. 5, 2017

(54) FORCE LIMITING DEVICE, BELT RETRACTOR HAVING A FORCE LIMITING DEVICE, AND METHOD FOR SWITCHING OVER A FORCE LIMITING DEVICE

(75) Inventor: Martin Roehrle, Mutlangen (DE)

(73) Assignee: TRW Automotive GmbH (DE)

( * ) Notice: Subject to any disclaimer, the term of this patent is extended or adjusted under 35 U.S.C. 154(b) by 436 days.

(21) Appl. No.: 13/881,760

(22) PCT Filed: Aug. 11, 2011

(86) PCT No.: PCT/EP2011/004023
§ 371 (c)(1),
(2), (4) Date: May 17, 2013

(87) PCT Pub. No.: WO2012/059146
PCT Pub. Date: May 10, 2012

(65) Prior Publication Data
US 2013/0248633 A1    Sep. 26, 2013

(30) Foreign Application Priority Data

Nov. 6, 2010   (DE) .................. 10 2010 050 696

(51) Int. Cl.
*B60R 22/34*    (2006.01)
*B60R 22/28*    (2006.01)

(52) U.S. Cl.
CPC .......... *B60R 22/34* (2013.01); *B60R 22/3413* (2013.01); *B60R 2022/286* (2013.01); *B60R 2022/288* (2013.01)

(58) Field of Classification Search
CPC ..... B60R 22/34; B60R 22/44; B60R 22/3413; B60R 22/3416; B60R 2022/288; B60R 2022/286; B60R 2022/327
USPC .......... 242/379.1, 382.3, 382.4, 383.1, 383.5
See application file for complete search history.

(56) References Cited

U.S. PATENT DOCUMENTS

| 6,616,081 B1 * | 9/2003 | Clute et al. ................ 242/379.1 |
| 6,969,089 B2 * | 11/2005 | Klingauf et al. ............. 280/805 |
| 8,636,239 B2 * | 1/2014 | Fleischmann et al. ....... 242/374 |
| 8,727,257 B2 * | 5/2014 | Dahlquist et al. ......... 242/379.1 |
| 2002/0084646 A1 | 7/2002 | Klingauf et al. |

(Continued)

FOREIGN PATENT DOCUMENTS

| DE | 19927427 | 1/2001 |
| DE | 10015048 | 10/2001 |
| DE | 102009023625 | 3/2010 |

(Continued)

*Primary Examiner* — Sang Kim
(74) *Attorney, Agent, or Firm* — Tarolli, Sundheim, Covell & Tummino LLP

(57) ABSTRACT

A force limiting device for a belt retractor is reversible from a higher restraining force level to a lower restraining force level by means of a reversing means during a force limiting phase, wherein the second restraining force level is largely determined by a performance of at least one force limiting element. The reversing means is arranged so that it accomplishes a significant work share upon reversing which is added to the performance of the force limiting element and thus temporarily increases the restraining force of the force limiting device. In this manner undershooting of the characteristic line of the force limiting device upon reversing to the lower restraining force level is compensated.

20 Claims, 6 Drawing Sheets

(56) References Cited

U.S. PATENT DOCUMENTS

2005/0224622 A1* 10/2005 Zolkower .................. 242/379.1
2010/0155519 A1* 6/2010 Moedinger et al. ....... 242/379.1

FOREIGN PATENT DOCUMENTS

DE     102008063639     6/2010
EP     1219510     7/2002

* cited by examiner

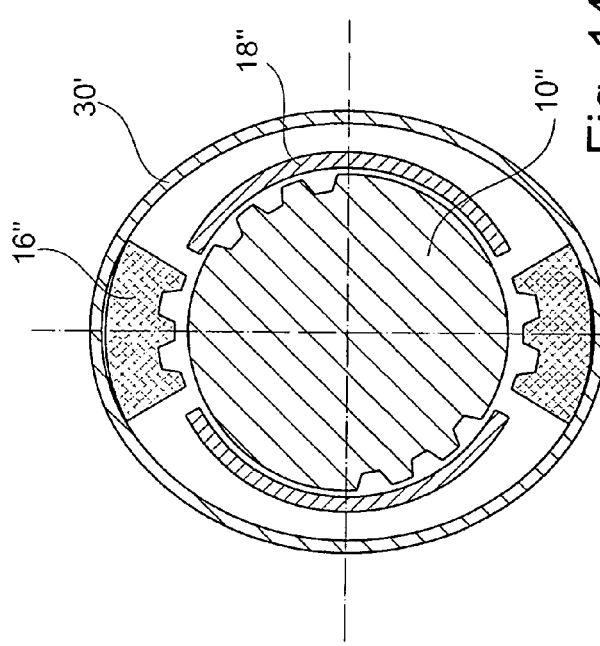
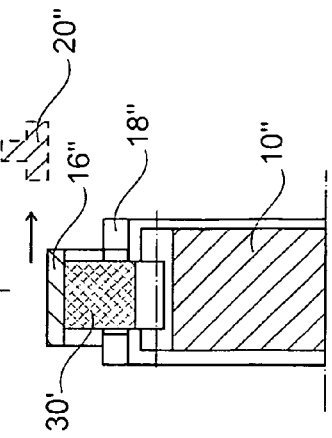
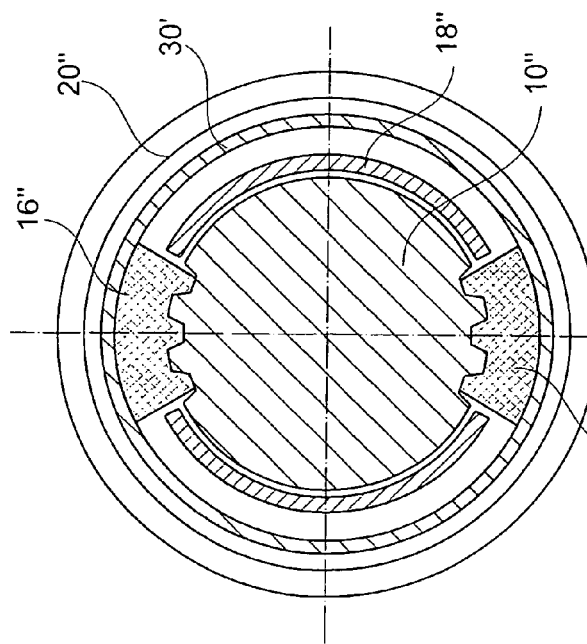
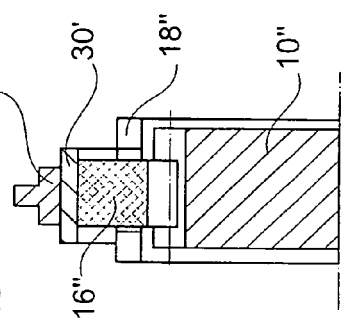
Fig. 12
Fig. 13
Fig. 14
Fig. 15

FORCE LIMITING DEVICE, BELT RETRACTOR HAVING A FORCE LIMITING DEVICE, AND METHOD FOR SWITCHING OVER A FORCE LIMITING DEVICE

RELATED APPLICATIONS

This application corresponds to PCT/EP2011/004023, filed Aug. 11, 2011, which claims the benefit of German Application No. 10 2010 050696.6, filed Nov. 6, 2010, the subject matter of which are incorporated herein by reference in their entirety.

BACKGROUND OF THE INVENTION

The invention relates to a force limiting device for a belt retractor as well as to a belt retractor comprising a force limiting device. The invention further relates to a method of reversing a force limiting device for a belt retractor.

Belt retractors comprising a force limiting device that in a case of restraint prevents the force acting on a vehicle occupant by a seat belt from excessively increasing are known in different configurations. In general it is desired to adapt the characteristic line of the restraining force to the vehicle occupant (size, weight etc.) and/or to adjust it to the current situation. It is common to first of all provide a high force level in any case. If, however, a lower restraining force is sufficient, for example for a light vehicle occupant, after a defined period of time reversing to a lower force level can be provided to relieve the vehicle occupant corresponding to his/her weight. A belt retractor comprising a force limiting device providing such functionality is shown, for instance, in DE 10 2008 063 639 A1.

Upon reversing to the lower force level, the abrupt drop of force can excite the elastically biased belt system to oscillate which is basically undesired as regards an optimum occupant restraint.

SUMMARY OF THE INVENTION

It is the object of the invention to enable a belt retractor including a force limiting device to change over from a higher force level to a predetermined lower force level so that the predetermined lower force level is reached as quickly as possible and is maintained.

This object is achieved by a force limiting device comprising the features of claim 1, by a belt retractor comprising the features of claim 12 and by a method comprising the features of claim 13. Advantageous and expedient configurations of the force limiting device according to the invention, of the belt retractor according to the invention as well as of the method according to the invention are described in the corresponding subclaims.

The force limiting device for a belt retractor according to the invention is reversible during a force limiting phase by means of a reversing means from a higher restraining force level to a lower restraining force level, the second restraining force level being largely determined by a performance of at least one force limiting element. The reversing means is established, according to the invention, so that it performs a significant work share during reversing which is added to the performance of the force limiting element and thus temporarily increases the restraining force of the force limiting device.

The invention is based on the finding that the oscillation occurring during reversing to the lower force level can be damped by appropriate measures. Especially a first undershooting of the characteristic line below the predetermined lower force level ("switching jump") is compensated by the additional performance of the reversing means completely or at least to the effect that the amplitude of a possible subsequent oscillation is considerably reduced. Accordingly, by a "significant" work share of the reversing means a work share is meant which exceeds mere shares of movement and friction of the components involved during reversing. Thus the reversing means in addition fulfills the function of a damping means, apart from its actual function—the reversing to the lower force level —. It is a substantial advantage of the damping function according to the invention that, due to its concept, it is provided exactly at the time of reversing.

A mechanically comparatively simple materialization of the inventive idea is resulting when the additional work share is accomplished by deformation. Accordingly, it is provided in the preferred embodiments that the reversing means includes a deformation element which is preferably plastically deformed upon reversing. So that the accomplished deforming work is added to the performance of the force limiting element significantly determining the lower force level, the deformation element itself has to be provided in the flux of the force limiting device during deformation or has to be deformed by a part disposed in the flux of force.

The magnitude of the work share to be accomplished by the reversing means can be systematically adjusted by the selection of the material, the dimensioning or shaping of the deformation element and/or by its direct mounting environment.

In order to allow the deformation to occur at the desired point in time preferably a retaining element is provided which can be transferred from the retaining position in which it prevents the deformation element from being deformed to a release position in which it permits deformation of the deformation element.

The retaining element can be transferred from the retaining position to the release position especially by a drivable actuator. In this way, with an appropriate design the reversing operation is triggered by activation of the actuator drive.

According to a preferred embodiment of the invention, the deformation element is designed so that it releases a transmission element by its deformation. In this case, the deformation element itself acts as a switch that can be referred to as "damped" switch due to the deforming work to be accomplished.

Preferably, prior to its release the transmission element is held at a part fixed to the vehicle by means of at least one blocking element, the blocking element being adapted to be transferred to an unlocked position in which the transmission element is released.

According to an advantageous configuration of the force limiting device the blocking element and the transmission element are arranged and tuned to each other so that a defined movement of the transmission element urges the blocking element into the unlocked position. Accordingly, no further parts or measures are required to release the transmission element. If during the force limitation a torque which causes rotation of the transmission element after unlocking is applied to the transmission element, for instance, solely the movement of rotation of the transmission element effectuates the transfer of the blocking element to the unlocked position.

In order to cause such force movement the blocking element and/or the deformation element can especially be provided to include a sloped section.

It is possible to form the blocking element and the deformation element at least partly of the same part. In this way the number of parts and the manufacturing steps are advantageously reduced.

The deformation element can be integrated in a component of the force limiting device, especially in a component fixed to the vehicle, but it can also be designed as separate component.

According to a further development of the invention, it can be provided that the reversing means is provided so that even after reversing it also determines the course of the second force level over a significant period of time. In this manner, the characteristic line of the force limiting device can be systematically influenced.

A subject matter of the invention is also constituted by a belt retractor for an automotive vehicle comprising a force limiting device according to the invention.

The object of the invention is also achieved by a method of reversing a force limiting device from a higher restraining force level to a lower restraining force level. The method comprises the steps of:

triggering a reversing operation to lower the restraining force from the higher restraining force level to the lower restraining force level;

subsequently providing a performance of at least one force limiting element of the force limiting device by which the lower restraining force level is largely determined; and during the reversing operation accomplishing a significant additional work share that is added to the performance of the force limiting element and thus temporarily increases the restraining force of the force limiting device.

BRIEF DESCRIPTION OF THE DRAWINGS

Further features and advantages of the invention are resulting from the following description and from the enclosed drawings which are referred to and in which:

FIG. 12 is a schematic top view of substantial components of a force limiting device according to the invention in accordance with a third embodiment prior to reversing;

FIG. 13 shows a sectional lateral view of the force limiting device in the state according to FIG. 12;

FIG. 14 shows the force limiting device of FIG. 12 after reversing;

FIG. 15 shows a sectional lateral view of the force limiting device in the state according to FIG. 14;

DESCRIPTION OF EXEMPLARY EMBODIMENTS

Figure 1:
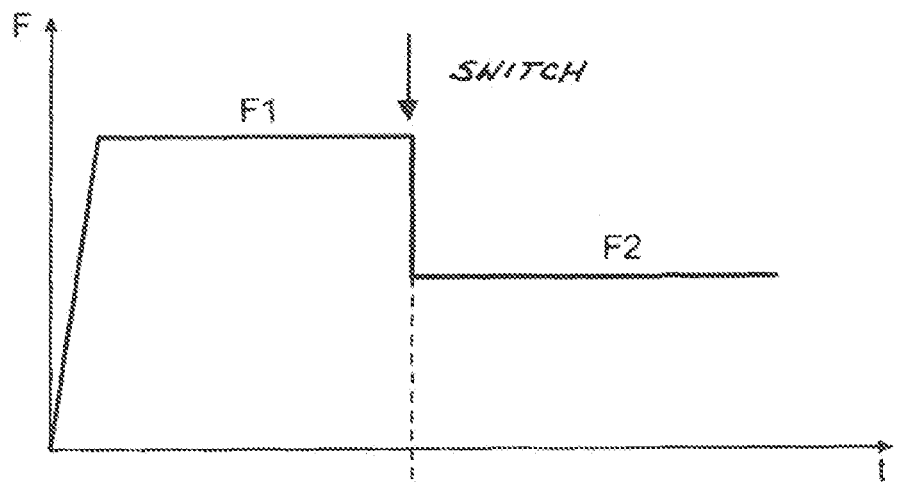
FIG. 1 shows a simplified force-time diagram of a force limiting device.

In FIG. 1 a simplified and idealized time course of a restraining force acting on a light vehicle occupant is shown in a seat belt system of an automotive vehicle in case that a force limitation takes place. After a defined period of time it is reversed from a predetermined higher force level F1 to a predetermined lower force level F2 which is sufficient for the light vehicle occupant.

The higher force level F1 can be determined, for example, by the performance of a torsion rod, the lower force level F2 can be determined, for example, by the performance of a wave washer, as described in DE 10 2008 063 639 A1 mentioned in the beginning. The type, the number and the structure of the force limiting means including the pertinent force limiting elements are not of vital importance to the invention. It is essential that the option of reversing from a higher force level to a lower force level is provided.

Figure 2:
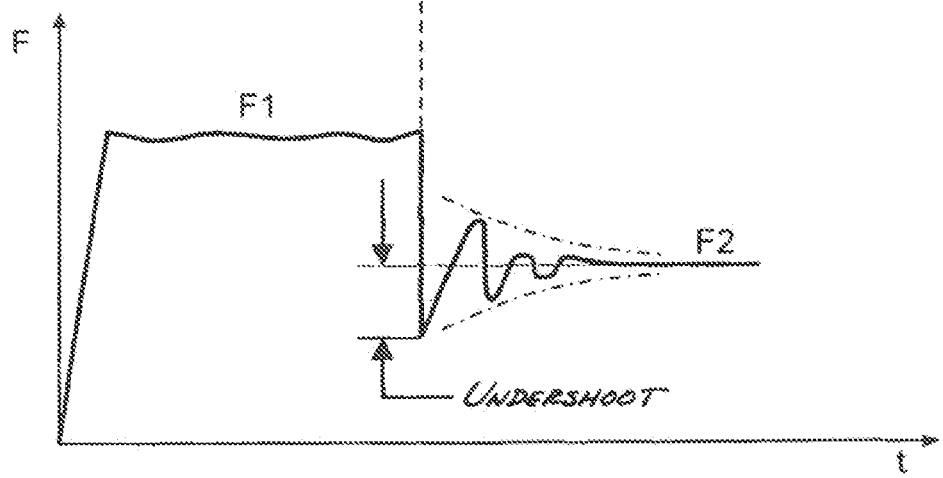
FIG. 2 shows an actual force-time diagram of a force limiting device according to the state of the art.

FIG. 2 shows a real course of the characteristic line of FIG. 1. The deviations from the idealized course can be explained as follows. The seat belt system is initially preloaded by the force F1. Particular components of the seat belt system, such as the belt strap, are elastically biased. Upon reversing the abrupt drop of the restraining force causes the elastically biased seat belt system to be excited for oscillation. As is visible in FIG. 2, the force level initially falls clearly below the desired lower force level F2. Oscillating, especially undesired "undershooting" of the lower force level F2, is continued over a particular period of time—although with a decreasing amplitude —.

In FIGS. 3 to 9 a first embodiment of a force limiting device for a belt retractor is shown by which the aforedescribed oscillation is damped. The basic functioning of the force limiting means including the pertinent force limiting elements (e.g. torsion rod and wave washer) is known from DE 10 2008 063 639 A1 so that this has not to be discussed in detail.

Figure 3:
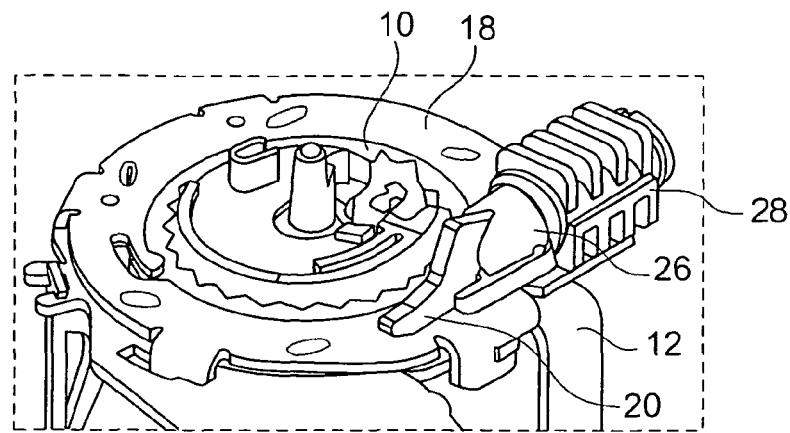
FIG. 3 shows a part of a force limiting device according to the invention according to a first embodiment in a perspective view prior to reversing.
Figure 4:
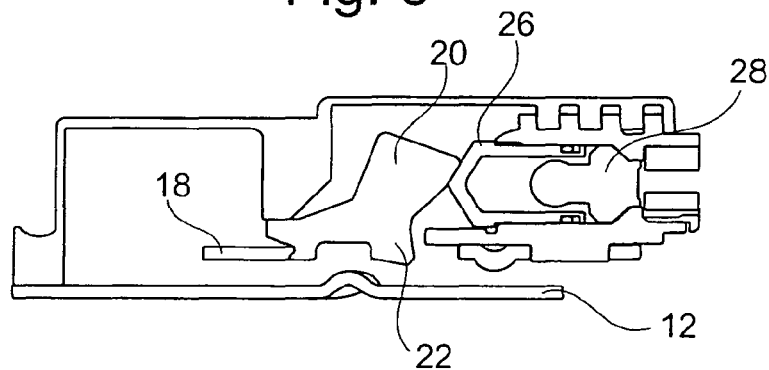
FIG. 4 shows a sectional lateral view of the force limiting device in the state according to FIG. 3.
Figure 5:
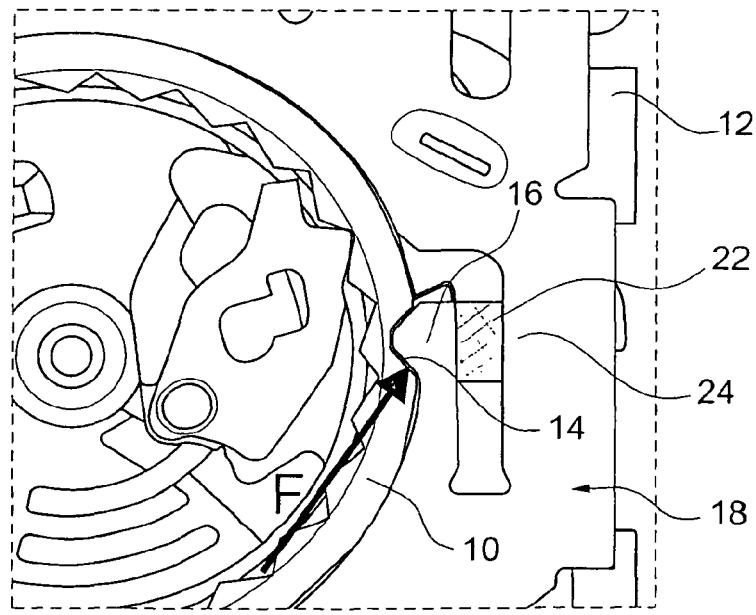
FIG. 5 is a top view of the force limiting device in the state according to FIG. 3.

The FIGS. 3 to 5 show the force limiting device in a state in which a higher level of the restraining force is provided. For reversing to a lower force level it is required to release a transmission element 10, here in the form of a ratchet wheel, provided in the flux of the force limiting device. More exactly speaking, the transmission element 10 to which a high torque is applied but which initially is held to be fixed (blocked) to the frame 12 has to be unlocked so that it can be twisted about its central axis.

As is especially evident from FIG. 5, on the outside the transmission element 10 has a recess 14 in which a blocking element 16, in this case in the form of a bending lever, engages prior to reversing. The blocking element 16 is integrated in a component 18 of the force limiting device fixed to the frame which in turn is fixedly arranged in the mounted state of the force limiting device. In accordance with the shown embodiment, the blocking element 16 is integrally formed with a so called wave washer fixedly connected to the frame 12.

The blocking element 16 is secured by a retaining element 20, in this case in the form of a movable retaining lever, of which only a lug 22 is shown in FIG. 5. The lug 22 of the retaining element 20 is clamped between the blocking element 16 and a support portion 24 of the component 18 fixed to the frame (wave washer) and does not allow the blocking element 16 to move out of the recess 14. The transmission element 10 is thus prevented from rotating.

Figure 6:
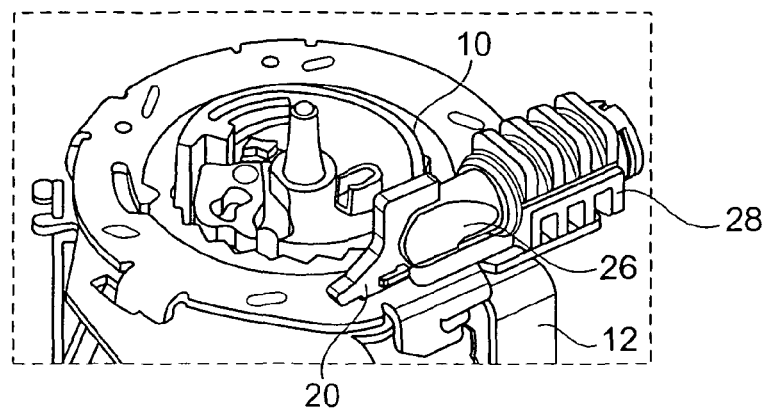
FIG. 6 shows the force limiting device of FIG. 3 after reversing.
Figure 7:
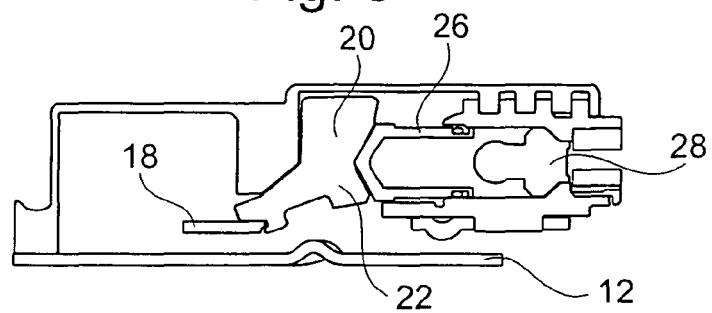
FIG. 7 shows a sectional lateral view of the force limiting device in the state according to FIG. 6.
Figure 8:
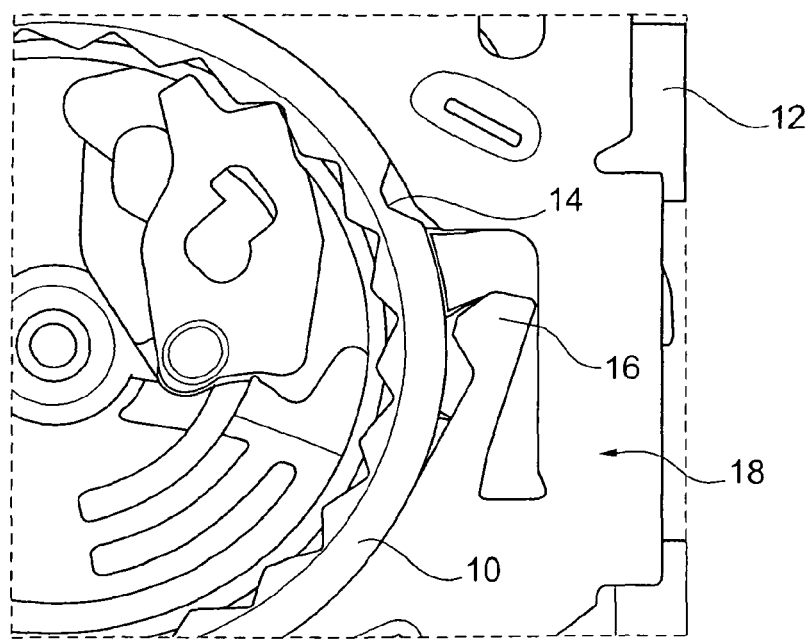
FIG. 8 is a top view of the force limiting device in the state according to FIG. 6 without a retaining lever.
Figure 9:
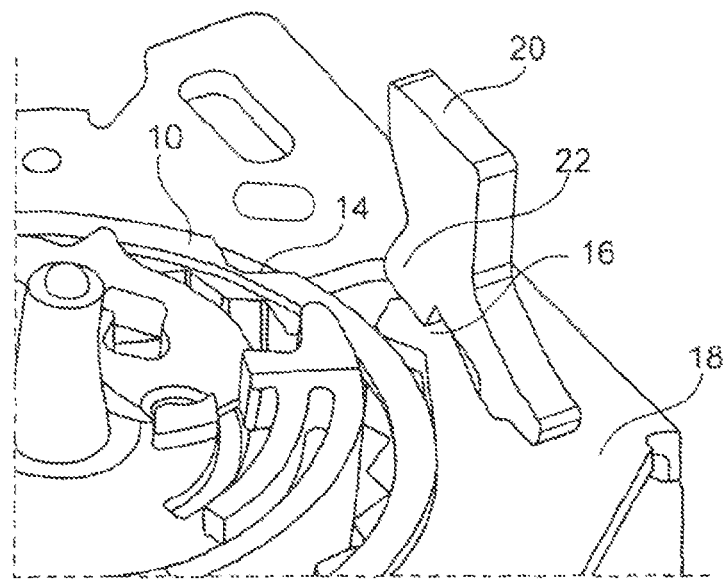
FIG. 9 shows a further perspective view of the force limiting device in the state according to FIG. 6.

For reversing to the lower force level the retaining element 20 is moved to a release position. In the shown embodiment the retaining lever is swiveled so that the lug 22 thereof does no longer hinder the blocking element 16 as is shown in FIGS. 6 and 7. To this end, an actuator 26 including a motor, pyrotechnical or other suitable drive 28 can be employed the activation of which triggers the reversing operation.

Now the blocking element 16 can be transferred to an unlocked position in which the blocking of the transmission element 10 is cancelled. Due to the sloped shape of the recess 14 of the transmission element 10 and the blocking element 16 (free end of the bending lever) the blocking element 16 is forced outwardly by a rotation of the transmission element 10 so far that the blocking element 16 does no longer act on the transmission element 10. The blocking element 16 is plastically deformed; therefore it can also be referred to as deformation element 16 in this case. Due to the plastic deformation the blocking element 16 remains in the unlocked position. This state is evident in FIGS. 8 and 9.

For transferring the blocking element 16 to the unlocked position the conversion of quite a considerable amount of energy is required. In order to bend the blocking element 6 away, a certain degree of deforming work has to be accomplished that depends on different factors, especially on material, bending cross-section and bending length of the blocking element 16.

Figure 11:
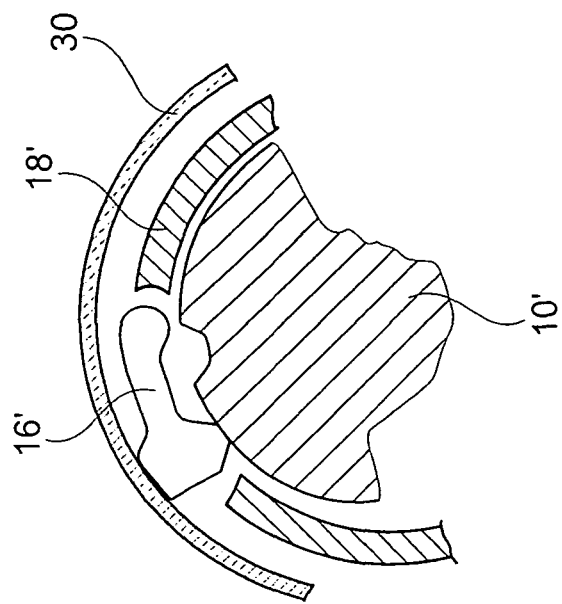
FIG. 11 shows the force limiting device of FIG. 10 after reversing.
Figure 10:
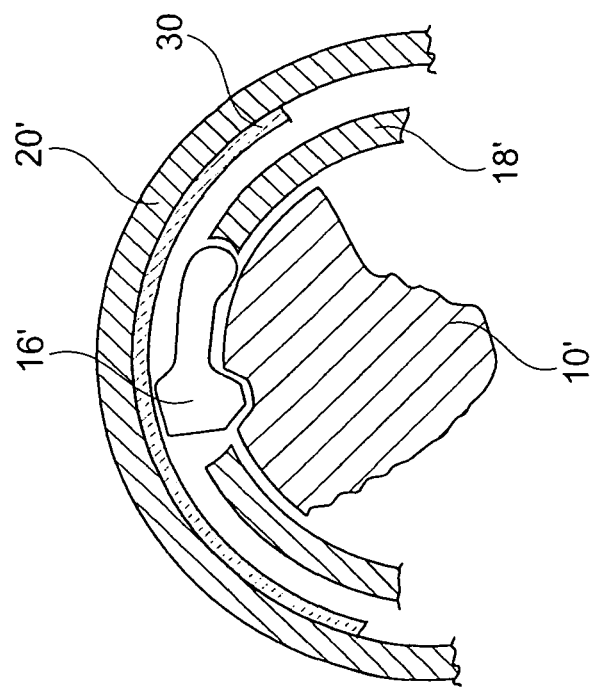
FIG. 10 is a schematic top view of substantial components of a force limiting device according to the invention in accordance with a second embodiment prior to reversing.

In FIGS. 10 and 11 a different embodiment of a reversible force limiting device is shown. Also in this case a blocking element 16' in the form of a pivoting lever blocks the rotation of a transmission element 10' relative to the component 18' supporting the blocking element 16' required for reversing to lower force level. The blocking element 16' is first of all retained by a retaining element 20' in the form of a rigid stable support ring, wherein a deformable intermediate ring 30 or intermediate ring portion is additionally disposed between the blocking element 16' and the retaining element 20'.

In the state according to FIG. 10 corresponding to a force limitation at a higher force level, the blocking element 16' is prevented from pivoting outwardly about its pivoting axis by the retaining element 20'. For reversing to the lower force level the retaining element 20' is moved to a release position, for instance by axial displacement. For this, in turn an actuator having a suitable drive can be used.

The intermediate ring (portion) 30 in this case serves as deformation element and is designed so that the blocking element 16' forced outwardly by the transmission element 10' deforms the deformation element 30 when the retention by the retaining element 20' is cancelled, as is illustrated in FIG. 11. The deforming work to be accomplished depends on the material and the dimensioning of the intermediate ring (portion) 30.

Another similar embodiment of a reversible force limiting device is shown in FIGS. 12 to 15. Here are provided two blocking elements 16" that block rotation of a transmission element 10" to which a torque is applied. The blocking elements 16" are secured in turn by a retaining element 20" in the form of a support ring preventing radial movement of the blocking elements 16". Between the blocking elements 16" and the retaining element 20" an intermediate ring serving as deformation element 30' is arranged (cf. FIGS. 12 and 13).

If the retaining element 20" is shifted to a lower force level for reversing the force limiting device (cf. FIG. 15), the transmission element 10" can urge the blocking elements 30' to the outside. Deforming work is accomplished at the deformation element 30'. In the case of diametrically opposed blocking elements 16" the retaining element 20" is deformed into an ellipse as is shown in FIG. 14.

Figure 16:
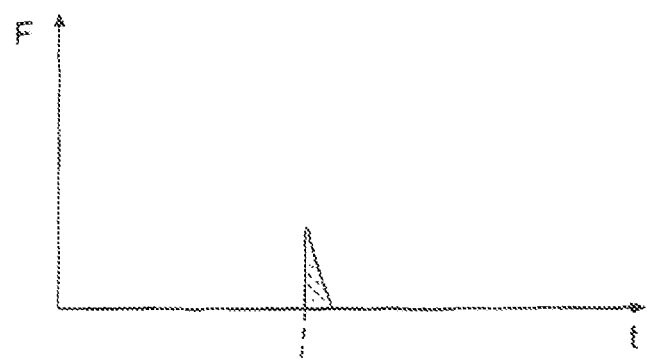
FIG. 16 is a force-time diagram of a deformation element of a force limiting device according to the invention.
Figure 17:
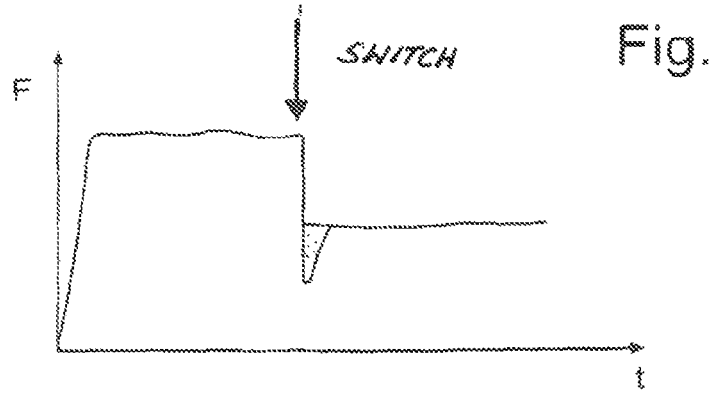
FIG. 17 is a force-time diagram of a force limiting device according to the invention including the deformation element.

In FIG. 16—exemplary for all embodiments—only the work share is shown in an isolated manner which is required for reversing to the lower force level so as to deform the deformation element 16; 30; 30'. In FIG. 17 illustrating the characteristic line of a force limiting device according to the invention it is evident that the deforming work is done exactly at the time when the restraining force would undershoot. The deforming work thus compensates or damps such undershooting so that the predetermined lower force level is reached quickly and is thereafter maintained.

Basically in all embodiments plural blocking elements 16; 16'; 16" but also plural deformation elements 16; 30; 30' can be provided. The force limiting device can also be configured so that over a quite long period of time, i.e. beyond the reversing operation, deforming work is accomplished, especially in order to obtain a smoother decreasing characteristic line. This can be achieved, for example, by providing plural deformation elements 16; 30; 30' that are deformed in a time-staggered manner.

The invention claimed is:

1. A force limiting device for a belt retractor in a vehicle that is reversible during a force limiting phase by means of a reversing means from a higher restraining force level to a lower restraining force level, wherein the lower restraining force level is determined at least in part by a performance of at least one force limiting element,
   wherein the reversing means is arranged so that during reversal a work share is accomplished which is added to the work share of the force limiting element and thus temporarily increases the restraining force of the force limiting device;
   wherein the reversing means includes a deformation element (16; 30;
   30') and a retaining element (20; 20'; 20") adapted to be transferred from a retaining position engaging the deformation element (16; 30; 30') to prevent deformation of the deformation element (16; 30; 30') to a release position spaced from the deformation element (16; 30; 30') to permit plastic deformation of the deformation element (16; 30; 30') in response to rotation of a transmission element (10; 10'; 10") relative to the retaining element (20; 20'; 20").

2. The force limiting device according to claim 1, further comprising a drivable actuator (26) for transferring the retaining element (20; 20'; 20") from the retaining position to the release position.

3. The force limiting device according to claim 1, wherein plastic deformation of the deformation element (16; 30; 30') releases the transmission element (10; 10'; 10") for rotation relative to the deformation element (16; 30; 30').

4. The force limiting device according to claim 3, wherein prior to its release the transmission element (10; 10'; 10") is held by at least one blocking element (16; 16'; 16") at a component fixed to the vehicle, the blocking element (16; 16'; 16") being adapted to be transferred to an unlocked position in which the transmission element (10; 10'; 10") is released.

5. The force limiting device according to claim 4, wherein the blocking element (16; 16'; 16") and the transmission element (10; 10'; 10") are disposed and tuned to each other so that a defined movement of the transmission element (10; 10'; 10) urges the blocking element (16; 16'; 16") to the unlocked position.

6. The force limiting device according to claim 4, wherein the blocking element (16; 16'; 16") and/or the deformation element (16; 30; 30') include a sloped portion.

7. The force limiting device according to claim 4, wherein a single, unitary component acts as the blocking element (16; 16'; 16") by engaging the transmission element (10; 10'; 10") to prevent rotation of the transmission element and acts as the deformation element (16; 30; 30') by plastically deforming to allow for rotation of the transmission element (10; 10'; 10") relative to the retaining element (20; 20'; 20").

8. The force limiting device according to claim 4, wherein a one-piece bending lever integrally formed with a component fixed to the vehicle acts as the blocking element by engaging the transmission element to prevent rotation of the transmission element and acts as the deformation element by plastically deforming to allow for rotation of the transmission element relative to the retaining element.

9. The force limiting device according to claim 1, wherein the deformation element (16; 30; 30') is integrally formed with a component (18) fixed to the vehicle.

10. The force limiting device according to claim 1, wherein the reversing means determines the degree of the lower force level over a period of time after reversing occurs.

11. A belt retractor for an automotive vehicle, including a force limiting device according to claim 1.

12. The force limiting device according to claim 1, wherein the deformation element is tubular and completely encircles a central axis of the belt retractor.

13. The force limiting device according to claim 1, wherein the retaining element is positioned radially outward of the deformation element and is concentric with the deformation element.

14. The force limiting device according to claim 1, wherein the retaining element when in the retaining position prevents outward radial movement of the deformation element relative to a central axis of the belt retractor.

15. The force limiting device according to claim 14, wherein the retaining element engages a radially outermost surface of the deformation element when in the retaining position.

16. A method of reversing a force limiting device for a belt retractor in a vehicle from a higher restraining force level to a lower restraining force level comprising the steps of:

performing a reversing operation for lowering the restraining force from the higher restraining force level to the lower restraining force level;

providing a force limiting element of the force limiting device having a performance which at least partially determines the lower restraining force level;

during the reversing operation accomplishing an additional work share by plastically deforming a deformation element by transferring a retaining element from a retaining position engaging the deformation element to prevent deformation to a release position spaced from the deformation element to permit plastic deformation of the deformation element;

rotating a transmission element relative to the retaining element to cause the deformation element to plastically deform; and adding the additional work share to the performance of the force limiting element to temporarily increase the restraining force of the force limiting device.

17. The method according to claim 16, wherein by deforming the deformation element (16; 30; 30') the transmission element (10; 10'; 10") of the force limiting device is released.

18. A force limiting device for a belt retractor in a vehicle comprising:

a reversing device for switching a force limiting phase from a higher restraining force level to a lower restraining force level, the lower restraining force level being determined in at least in part by a performance of at least one force limiting element;

a deformation element that is plastically deformed to provide force limitation during switching of the force limiting phase; and a retaining element positioned radially outward of the deformation element relative to a central axis of the belt retractor, the retaining element being adapted to be transferred from a retaining position engaging the deformation element to prevent deformation of the deformation element to a release position spaced from the deformation element to permit deformation of the deformation element;

wherein the reversing device is arranged so that during reversal a work share is accomplished which is added to the work share of the force limiting element to thereby temporarily increase the restraining force of the force limiting device.

19. The force limiting device according to claim 18, wherein the deformation element is tubular and completely encircles the central axis of the belt retractor.

20. The force limiting device according to claim 18, wherein the retaining element is positioned radially outward of the deformation element and is concentric with the deformation element.

* * * * *